(12) United States Patent
Jiang et al.

(10) Patent No.: US 12,257,978 B2
(45) Date of Patent: Mar. 25, 2025

(54) SYSTEM AND METHOD FOR KEY ABSENCE MANAGEMENT IN A VEHICLE

(71) Applicant: GM GLOBAL TECHNOLOGY OPERATIONS LLC, Detroit, MI (US)

(72) Inventors: Meng Jiang, Rochester Hills, MI (US); Louis G. Hector, Jr., Shelby Township, MI (US); Yongjie Zhu, Troy, MI (US); David T. Proefke, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 247 days.

(21) Appl. No.: 18/098,823

(22) Filed: Jan. 19, 2023

(65) Prior Publication Data

US 2024/0246511 A1 Jul. 25, 2024

(51) Int. Cl.
*B60R 25/24* (2013.01)
*B60R 25/25* (2013.01)
*B60R 25/34* (2013.01)

(52) U.S. Cl.
CPC ............ *B60R 25/241* (2013.01); *B60R 25/25* (2013.01); *B60R 25/34* (2013.01)

(58) Field of Classification Search
CPC ........ B60R 25/241; B60R 25/25; B60R 25/34
USPC ......................................................... 340/5.61
See application file for complete search history.

(56) References Cited

U.S. PATENT DOCUMENTS

| | | | |
|---|---|---|---|
| 10,377,345 B1* | 8/2019 | Oesterling | H04W 4/80 |
| 2007/0024419 A1* | 2/2007 | Nakane | B60R 25/255 |
| | | | 340/5.72 |
| 2019/0202404 A1* | 7/2019 | Atsumi | B60R 25/34 |
| 2021/0158638 A1* | 5/2021 | Hassani | G07C 9/00309 |

* cited by examiner

*Primary Examiner* — Kam Wan Ma
(74) *Attorney, Agent, or Firm* — Quinn IP Law

(57) ABSTRACT

A system for key absence management in a vehicle configured to be started by an electronic key fob includes a key absence management controller that implements a method configured to authorize starting of the vehicle by monitoring presence and absence of the electronic key fob in the vehicle. If the controller finds the electronic key fob to be present in the vehicle, then the controller authorizes starting of the vehicle. If the controller finds the electronic key fob to be absent from the vehicle, then the controller authorizes starting of the vehicle based on detection of a keyless authority indicator. A vehicle configured to be started by an electronic key fob includes the system with the controller that implements the method.

11 Claims, 4 Drawing Sheets

SYSTEM AND METHOD FOR KEY ABSENCE MANAGEMENT IN A VEHICLE

INTRODUCTION

The present disclosure generally relates to a system for authorizing vehicle operation such as when an electronic key fob is absent from the vehicle. Modern vehicles are often operable via an electronic key fob in that a vehicle operator is able to start the vehicle when the electronic key fob is in the vehicle. For example, an operator in a vehicle interior cabin may press a button on a vehicle dashboard to start the vehicle when the electronic key fob is in the interior cabin.

SUMMARY

Most vehicles operable via a key fob are unable to be started when the electronic key fob is not in the vehicle. Additionally, after an initial presence when the vehicle is started, there are some situations where the electronic key fob may subsequently become absent from the running vehicle and unavailable to a vehicle operator. For example, a person may exit the vehicle with the electronic key fob after the vehicle is started and is in park mode and may leave the electronic key fob behind upon returning to the vehicle (or does not return to the vehicle at all, such as if another person then drives away in the started vehicle). In another example, the electronic key fob may be dropped or discarded from the vehicle when the vehicle is out of park, such as in drive mode. In such situations, after shutting down the vehicle, an operator would typically be unable to subsequently restart the vehicle without the electronic key fob present in the vehicle.

The present disclosure provides a system and method of key absence management that selectively authorizes operation of the vehicle (e.g., restarting the vehicle after a shutdown in which the electronic key fob was not present at the time of the shutdown) in a secure manner by limiting the conditions under which restart is authorized. Additionally, the system and method may include a key missing alert strategy that helps to minimize the possibility of an operator inadvertently leaving a key fob behind. The system and method may also include a shift lock strategy implemented when the electronic key fob is not present and with shift lock override.

More specifically, a system for key absence management in a vehicle configured to be started by an electronic key fob is provided. The system includes a key absence management controller (KAM controller). The KAM controller is configured to authorize starting of the vehicle by monitoring presence and absence of the electronic key fob within the vehicle. If the KAM controller finds the electronic key fob to be present in the vehicle, then the KAM controller authorizes starting (e.g., startup) of the vehicle based on the presence of the electronic key fob in the vehicle. However, if the KAM controller finds the electronic key fob to be absent from the vehicle, then to prevent vehicle occupants from being stranded due to a lost or unavailable electronic key fob, the KAM authorizes starting of the vehicle based on detection of a keyless authority indicator. Stated differently, the KAM controller will not authorize starting of the vehicle when the electronic key fob is absent from the vehicle unless the KAM controller detects the keyless authority indicator. The requirement of a keyless authority indicator helps to prevent theft or other unauthorized use of the vehicle in such situations where the electronic key fob is not in the vehicle.

The keyless authority indicator may be a variety of indicators as discussed herein. In one example, the keyless authority indicator may be associated with the presence of a uniquely identifiable personal wireless communication device in the vehicle both at the time of a last vehicle shutdown request and at the time of a next requested restart. In another example, the keyless authority indicator may be an access code provided to the KAM controller by a personal wireless communication device in the vehicle or via an operator input device of the vehicle. In another example, the keyless authority indicator may be biometric data of a vehicle operator or other vehicle occupant, such as a fingerprint provided via the operator input device, facial recognition provided via an in-vehicle camera, etc. In still another example, the keyless authority indicator may be a communication of a grant or confirmation of restart authority from a remote server communicating with a cellular communications device onboard the vehicle.

In an implementation, restart authorization is based on personal wireless communication devices present in the vehicle at the time of the vehicle shutdown request or at least after the shutdown request and before actual shutdown. More specifically, the KAM controller is configured to receive a vehicle shutdown request and, prior to vehicle shutdown, determine the presence of a personal wireless communication device in the vehicle. The KAM controller then stores an indicator associated with the personal wireless communication device. The keyless authority indicator on which the subsequent restart is based may then be an identification of the personal wireless communication device associated with the stored indicator being present in the vehicle when restart is requested.

The KAM controller may wait to determine the presence of a personal wireless communication device on which the keyless authority indicator will be based until a predetermined period of time has run after the shutdown request. For example, the KAM controller may start a timer when vehicle shutdown is requested and store an indicator associated with the personal wireless communication device after the timer runs for a predetermined period of time. This may be implemented, for example, if a restart without a keyless authority indicator is permitted during that predetermined period of time immediately after shutdown.

In another example, the KAM controller is configured to receive an access code from a personal wireless communication device in the vehicle or via an operator input device of the vehicle, such as a touchscreen or keyboard. The access code is the keyless authority indicator. In some examples, the keyless authority indicator is granted via interaction with a remote server. In other examples, the access code is provided to the operator during the shutdown process in which the electronic key fob is absent.

In still another example, the keyless authority indicator may be biometric data of a vehicle operator or other vehicle occupant. This may be provided by a fingerprint identifier on the operator input device, a voice identification system, or a face identifier or retinal scan via a camera of the vehicle operatively connectable to the KAM controller.

In some implementations, the KAM controller may authorize starting of the vehicle based on the keyless authority indicator a single time. Stated differently, the keyless authority indicator is good for one-time use. Examples include when the keyless authority indicator is based on the presence of a personal wireless communication device in the vehicle that was also present after the last prior start and prior to the last vehicle shutdown, biometric data of a vehicle occupant at the time of the last vehicle shutdown, or when the keyless authority indicator is an access code from a personal wireless communication device as described above.

In addition to managing restarts in the absence of the electronic key fob, the system may decrease the potential for an operator to unknowingly operate the vehicle without the electronic key fob present, and may do so based on the power mode of the vehicle (e.g., whether in park or out of park) and/or based on the open or closed status of a door or a window:

For example, the KAM controller may be configured to receive information indicative of an in park/out of park status of the vehicle and receive information indicative of an open/closed status of at least one door and/or window. The KAM controller may then provide audio and/or visual alerts indicative of the absence of the electronic key fob in the vehicle and based on the in park/out of park status of the vehicle and/or considering whether a door or a window has been opened since the vehicle has been started or since last achieving a parked status. In an example, if the vehicle is still in park, the alert may cause the operator to retrieve the electronic key fob, such as if the operator left the vehicle momentarily after starting it and did not return with the electronic key fob. In another example, if the vehicle is out of park, the audio and/or visual alerts will inform the operator that the electronic key fob has become absent during movement of the vehicle, such as being dropped out of an open window by a child passenger. The determination of presence of the electronic key fob 14 may be periodically performed or triggered upon changes in status of the vehicle, such as opening and/or closing of door. The KAM controller may allow the operator to acknowledge and then inhibit the alerts. In an instance in which the started vehicle is still in a park state, the operator may be able to override a shift lock to continue into an out of park state. The KAM controller may take the steps described above to establish a keyless authority indicator that may then be used for restart authorization as described above (e.g., for the next vehicle restart).

A method of key absence management of a vehicle configured to be started with an electronic key fob may include monitoring presence and absence of the electronic key fob in the vehicle. Based on the presence of the electronic key fob in the vehicle, the method may include authorizing starting of the vehicle. Based on the absence of the electronic key fob in the vehicle, the method may include detecting a keyless authority indicator and authorizing starting of the vehicle based on the keyless authority indicator. In some implementations, authorizing starting of the vehicle based on the keyless authority indicator may occur a single time.

In an example, the keyless authority indicator is associated with at least one of: the presence of a personal wireless communication device in the vehicle, an access code received from a personal wireless communication device in the vehicle or via an operator input device of the vehicle, or biometric data of a vehicle operator or other vehicle occupant.

In an example, the method may further include receiving a vehicle shutdown request, and, prior to vehicle shutdown, determining the presence of a personal wireless communication device in the vehicle and storing an indicator associated with the personal wireless communication device. The keyless authority indicator may be an identification of the personal wireless communication device associated with the stored indicator being present in the vehicle.

In an implementation, the method may further include starting a timer when vehicle shutdown is requested in the absence of electronic key fob. Storing an indicator associated with the personal wireless communication device may occur after the timer runs for a predetermined period of time.

In another example, the method may include receiving an access code from a personal wireless communication device in the vehicle, with the access code serving as the keyless authority indicator. In still another example, the keyless authority indicator may be granted via interaction with a remote server, such as via interaction of a cellular communications device included onboard the vehicle with a remote server.

In an example, the method may include receiving information indicative of an in park/out of park status of the vehicle, receiving information indicative of an open/closed status of at least one of the door and the window, and providing audio and/or visual alerts indicative of the absence of the electronic key fob in the vehicle. The audio and/or visual alerts may be based on the open/closed status of at least one of the door and the window and/or based on the in park/out of park status of the vehicle.

Within the scope of the disclosure, a vehicle configured to be started by an electronic key fob may include a vehicle body defining an interior space and a KAM controller configured to authorize starting of the vehicle by monitoring presence and absence of the electronic key fob in the interior space. Based on the presence of the electronic key fob in the interior space, the KAM controller is configured to authorize starting of the vehicle; based on the absence of the electronic key fob in the interior space, the KAM controller is configured to detect a keyless authority indicator and authorize starting of the vehicle based on the keyless authority indicator.

In an example, the vehicle may include a local wireless communications device in the vehicle configured to be operatively connected with a personal wireless communication device in the vehicle via short range wireless technology (e.g., via BLUETOOTH®). The KAM controller may be configured to be operatively connected to the local wireless communications device. The keyless authority indicator may be an identification of the personal wireless communication device being present in the vehicle as communicated to the KAM controller by the local wireless communications device.

The vehicle may also include a cellular communications device and the keyless authority indicator may be a grant or confirmation of authorization communicated via interaction of the cellular communications device onboard the vehicle with a remote server.

The vehicle may include an operator input device configured to receive input from a vehicle operator or other vehicle occupant present in the interior space and/or a camera configured to identify the vehicle occupant. The operator input device and/or camera may be configured to be operatively connected to the KAM controller. The keyless authority indicator may be associated with input received by the operator input device and/or camera. For example, the operator input device may be a touchscreen or a key board on which the vehicle operator or other vehicle occupant enters an access code or applies a fingerprint that serves as the keyless authority indicator. The camera may capture facial recognition and/or retinal recognition of the vehicle occupant that serves as the keyless authority indicator.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings described herein are for illustrative purposes only, are schematic in nature, and are intended to be exemplary rather than to limit the scope of the disclosure.

DETAILED DESCRIPTION

Figure 1:
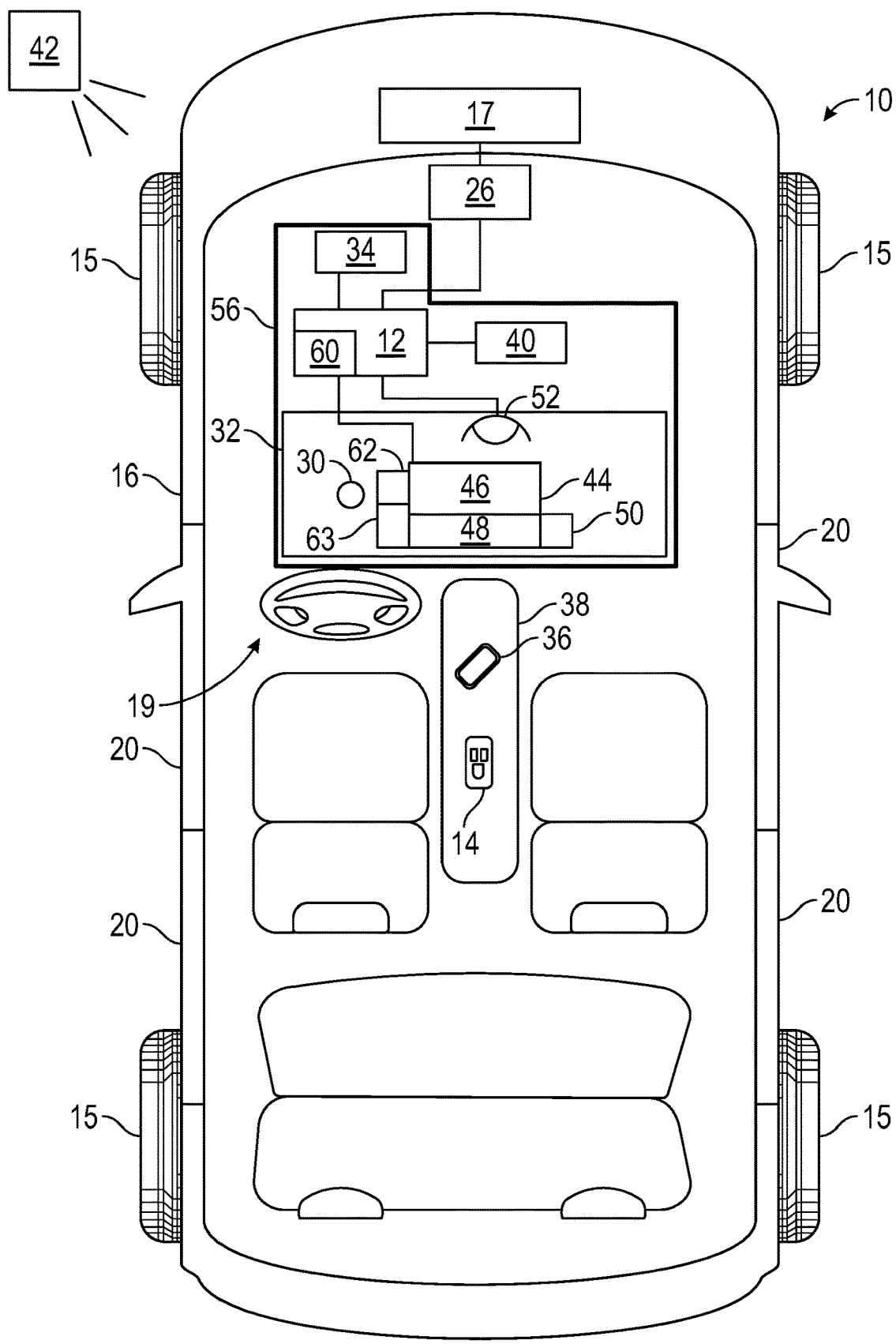
FIG. 1 is a plan view illustration of a vehicle configured to be started by an electronic key fob, and a remote server, the vehicle including a system for key absence management, and showing both an electronic key fob and a personal wireless communication device present in the vehicle.
Figure 2:
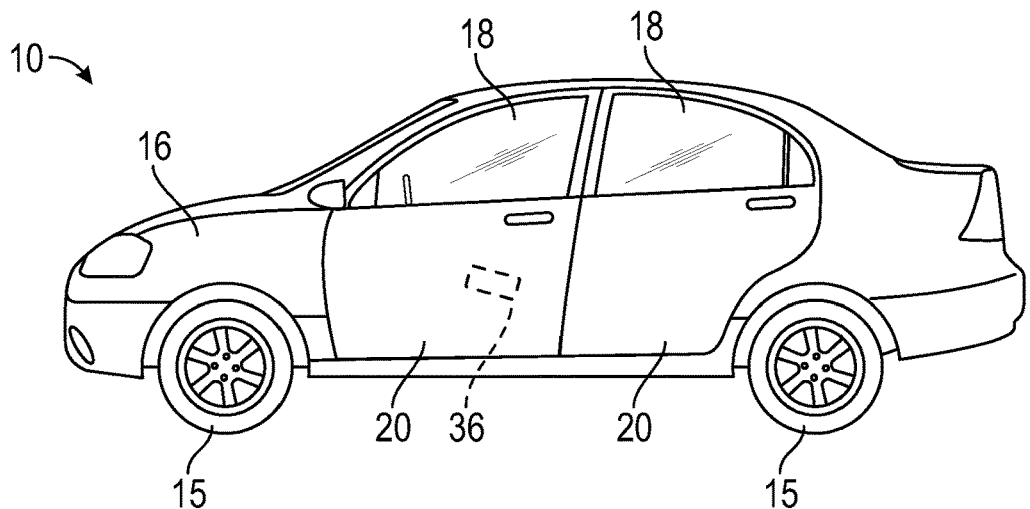
FIG. 2 is a side view illustration of the vehicle of FIG. 1 with the electronic key fob absent from the vehicle and the personal wireless communication device present in the vehicle.
Figure 3:
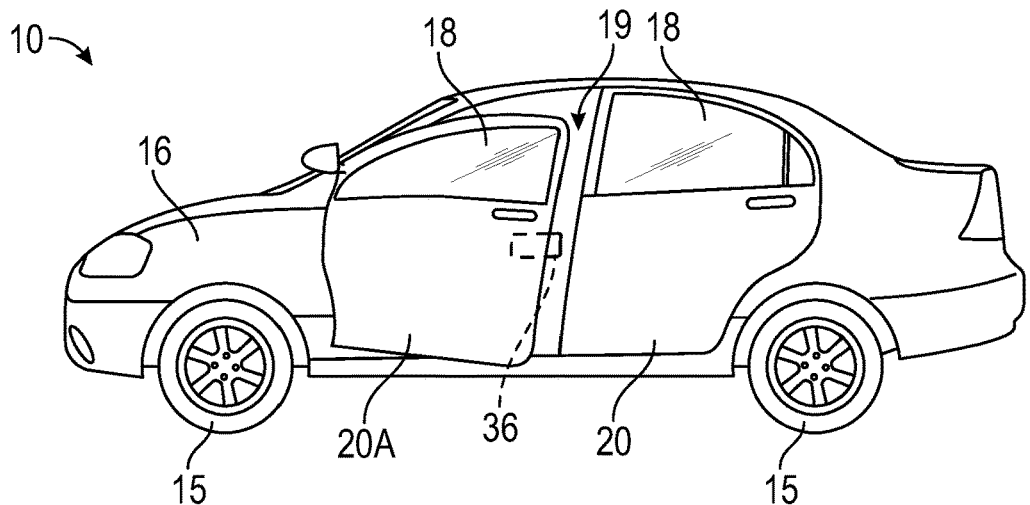
FIG. 3 is a side view illustration of the vehicle of FIG. 2 with a vehicle door shown in an open state.
Figure 4:
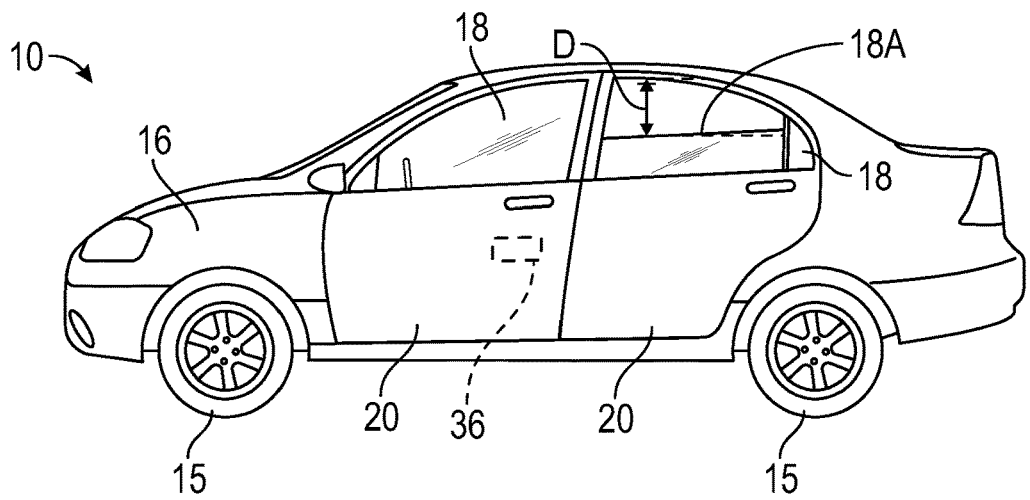
FIG. 4 is a side view illustration of the vehicle of FIG. 2 with a vehicle window shown in an open state.

FIG. 1 shows a vehicle 10 that is equipped with a computerized vehicle key absence management (KAM) controller 12 enabling restart of the vehicle 10 both when an electronic key fob 14 is present in the vehicle 10, and, under certain conditions, even when the electronic key fob 14 is absent from the vehicle 10. The vehicle 10 may be any type of vehicle, such as a passenger vehicle, a sport utility vehicle, a pickup truck, etc. The vehicle 10 has wheels 15 that may be powered for movement by a powertrain 17, which may include an internal combustion engine, an electric motor, a battery pack, a fuel cell stack, a transmission, or a combination thereof. In the example shown, the vehicle 10 is a passenger vehicle having a vehicle body 16 that defines and encloses an interior space 19 that may be referred to as an interior cabin. The interior space 19 also includes any trunk space and other compartments provided in the vehicle 10. The vehicle body 16 includes a plurality of openable and closable doors 20 through which occupants may enter and exit from the interior space 19. As shown in FIGS. 2-4, the doors 20 may each include an openable and closeable window 18. FIG. 3 shows the driver's side door 20 of FIG. 2 in an open position indicated as 20A.

The vehicle 10 is started by placing the powertrain 17 in an "on" mode such as via a command from an electronic control module (ECM) 26. The ECM 26 is also operatively connected to the KAM controller 12. For example, when the powertrain 17 includes an engine, the "on" mode is when the engine is running. The vehicle operator may depress an on/off button 30 disposed on a vehicle dashboard 32. The on/off button may also be referred to as a start/stop button. When the vehicle 10 is off, depressing the on/off button 30 serves as a start request. When the vehicle 10 is on, depressing the on/off button serves as a shutdown request. Pressing the on/off button 30 after the vehicle shuts down following a shutdown request is referred to herein as a restart request. The on/off button 30 may be connected to the KAM controller 12 by transfer conductors (e.g., wires) or wirelessly to communicate the start request to the KAM controller 12. The KAM controller 12 is operatively connected to ECM 26, and the KAM controller 12 is equipped to authorize and enable powertrain 17 through commands and information provided to ECM 26.

The vehicle 10 is configured so that if the electronic key fob 14 is present in the vehicle 10 (e.g., in the interior space 19 as shown resting on the console 38 in FIG. 1), depressing the on/off button 30 in the presence of the authorized electronic key fob 14 will enable the KAM controller 12 to authorize and command the ECM 26 to command the powertrain 17 to the "on" mode (e.g., start the vehicle 10). The vehicle 10 is referred to as "running" or "on" after it has been started and before it has been shut down. Following the start of the vehicle 10 with the electronic key fob 14 present, there are several ways in which the electronic key fob 14 can become absent from the running vehicle 10. For example, when the vehicle 10 is on and in park, the electronic key fob 14 may be accidentally or intentionally removed from the vehicle 10, such as when one of the doors 20 is opened and the vehicle operator or another vehicle occupant leaves the vehicle 10 momentarily and then returns without the electronic key fob 14. Alternatively, when the vehicle 10 is on and in park or out of park with a brake depressed, a vehicle occupant may leave the vehicle 10 and not return, taking the electronic key fob 14 with them, such as when the occupant is dropped off at a destination such as the airport. In another example, the vehicle 10 may be on and in park, and the electronic key fob 14 may be passed out of an open vehicle window 18 to a bystander such as when the electronic key fob 14 is in a bag or jacket which is intentionally being removed from the vehicle. In still another example, the vehicle 10 may be on, out of park, and in forward or rearward motion, and the electronic key fob 14 may be accidentally or intentionally discarded from the vehicle 10, such as when one of the windows 18 is open. Out of park may also be referred to as "in gear".

The KAM controller 12 is equipped to handle these and other situations to allow a vehicle restart with the now absent electronic key fob 14. The KAM controller 12 may also be operable to implement a key fob missing alert strategy to alert the vehicle operator to the absence of the electronic key fob 14 so that, perhaps, the electronic key fob 14 may be retrieved. The KAM controller 12 may also implement a shift lock strategy that includes shift inhibiting features that also serve as notification to the vehicle operator that the electronic key fob 14 is not present, although these may be overridden by the vehicle operator in some instances to avoid stranding an authorized vehicle driver.

The vehicle 10 includes a local wireless communication device (LWCD) 34 that is equipped to communicate with personal electronic communication devices in the vehicle 10 via BLUETOOTH® or otherwise, such as with the personal wireless communication device (PWCD) 36 shown resting on the console 38 in the vehicle 10 in FIG. 1. The PWCD 36 may be, but is not limited to, a cellular phone, a tablet, a laptop, or a wearable computing device such as a smart watch. The KAM controller 12 is operatively connected to the LWCD 34. The vehicle 10 also includes a cellular communications device (CCD) 40 that is equipped to communicate with a remote server 42 to receive cellular communications. The CCD 40 is also operatively connected to the KAM controller 12.

The vehicle 10 includes an operator input device 44 configured to receive input from a vehicle operator or other vehicle occupant present in the interior space 19. The example operator input device 44 shown includes a touch-screen 46, a key board 48, a fingerprint pad 50, and a microphone 62 that may be part of a vehicle audio system 63. The fingerprint pad 50 may enable identifying an occupant by their fingerprint. The vehicle 10 also includes a camera 52 configured to capture an image of the vehicle occupant to identify the vehicle occupant, and may enable facial recognition and/or retinal recognition of the vehicle occupant. The microphone 62 may enable voice recognition. The input device 44 and camera 52 thus enable data to be provided to the KAM controller 12, as the input device 44 and the camera 52 are both operatively connected to the KAM controller 12.

The vehicle 10 includes a system 56 for key absence management in the vehicle 10. The system 56 includes the KAM controller 12, the LWCD 34, and the CCD 40 and, in embodiments that include remote access code entry or biometric data as keyless authority indicators as described herein, the system 56 also includes the input device 44 and the camera 52. In embodiments that do not include remote access code entry or biometric data as keyless authority indicators, the system 56 need not include an operator input device or a camera.

Figure 5A:
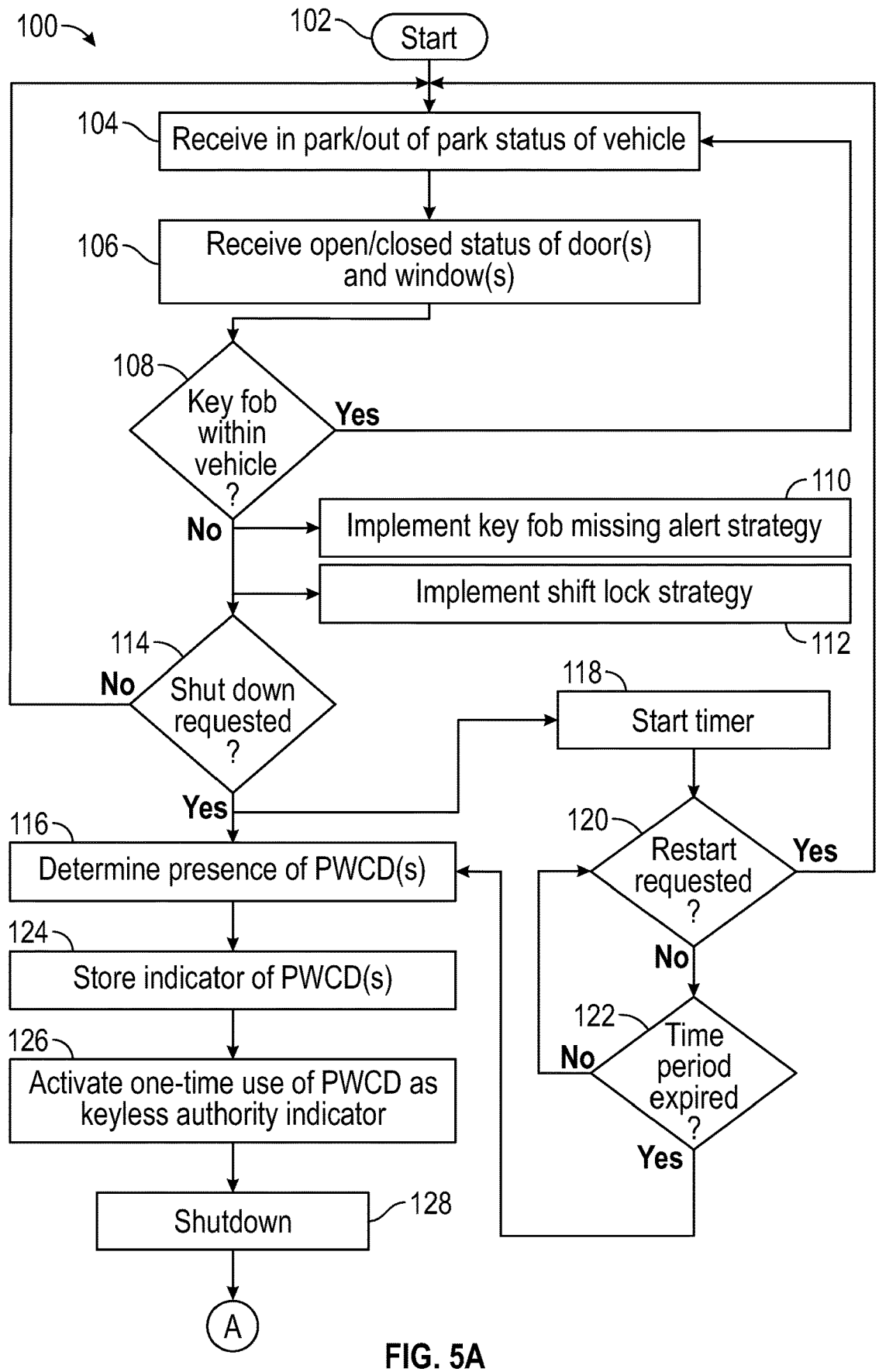
FIG. 5A is a portion of a flow diagram illustrating a method of key absence management of the vehicle of FIGS. 1-4.
Figure 5B:
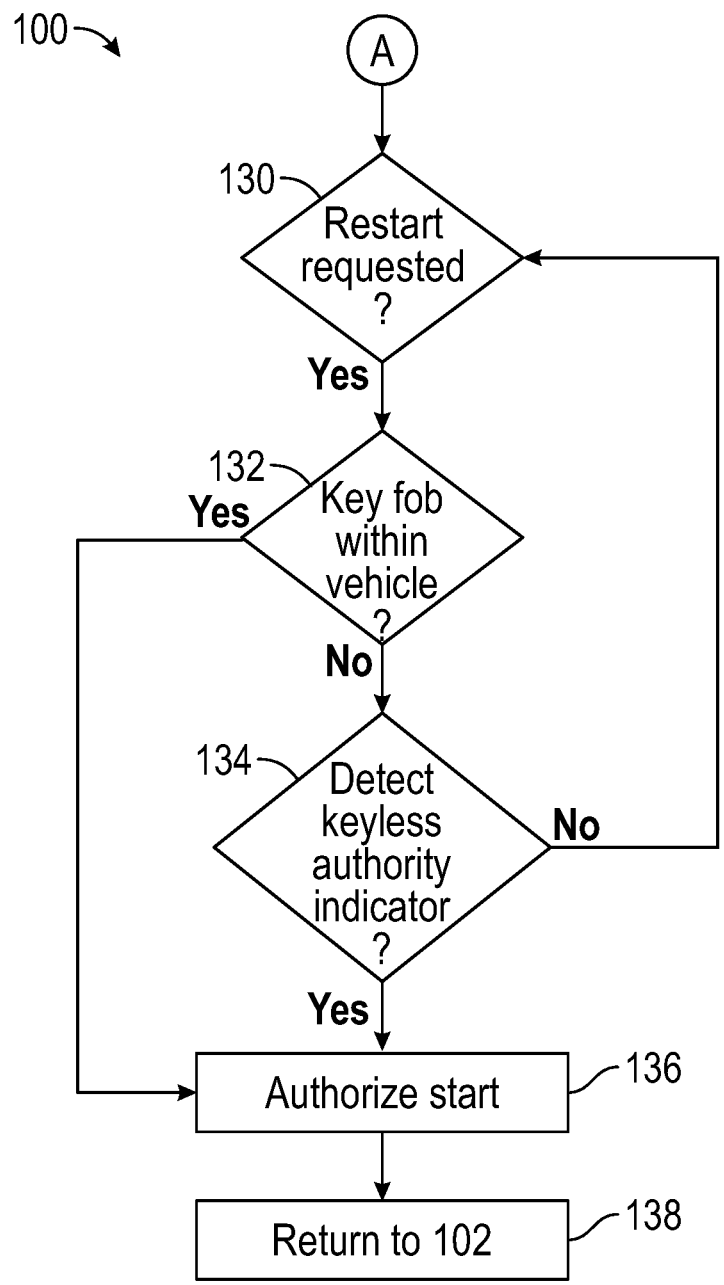
FIG. 5B is a remaining portion of the flow diagram of FIG. 5A.

The KAM controller 12 executes a method 100 of key absence management of the vehicle 10, illustrated as a flow diagram in FIGS. 5A-5B. The KAM controller 12 is a computerized device including a computerized processor, one or more timers (such as timer 60), RAM, and durable memory for storing programming and other system information. The KAM controller 12 includes an operating system useful for executing stored programs or applications such as the method 100. The KAM controller 12 may include a communications device useful for communication with outside devices or systems, an input/output controller useful for communication with a user and/or other connected devices (such as, for example, the ECM 26, the LWCD 34, the CCD 40, the operator input device 44, and the camera 52), and a memory device useful for storing data and programming.

The KAM controller 12 is configured to authorize starting of the vehicle 10 by monitoring presence and absence of the electronic key fob 14 in the vehicle 10. If the KAM controller 12 finds the electronic key fob 14 to be present in the vehicle 10, the KAM controller 12 authorizes starting of the vehicle 10 when on/off button 30 is actuated to request starting based on the presence of the electronic key fob 14 in the vehicle 10. However, if the KAM controller 12 finds the electronic key fob 14 to be absent from the vehicle 10, to prevent vehicle occupants from being stranded due to a lost or unavailable electronic key fob 14, the KAM controller 12 authorizes starting of the vehicle 10 based on detection of a keyless authority indicator if the request associated with on/off button 30 activation is associated with a restart event which follows a shutdown during which the electronic key fob 14 was deemed to be absent from the interior cabin 19.

In one example, the keyless authority indicator may be associated with the presence of a PWCD 36 in the vehicle 10 both at the time of a last vehicle shutdown request and at the time of a next requested restart. More specifically, if the same PWCD 36 is present both at the time of a last vehicle shutdown request (or at least after the shutdown request and before actual shutdown) and at the time of a next requested restart, its presence serves as the keyless authority indicator for authorizing restart when detected by the KAM controller 12 via the LWCD 34 to which the PWCD 36 is connected by BLUETOOTH® or otherwise.

The KAM controller 12 is configured to receive a vehicle shutdown request, such as by the vehicle operator pressing the on/off button 30 while the vehicle 10 is running and in park mode. Prior to enabling actual vehicle shutdown, the KAM controller 12 determines the presence of a PWCD 36 in the vehicle 10, such as by commanding the LWCD 34 to scan the vehicle for any PWCDs in the vehicle 10 and communicate an indicator associated with the PWCDs to the KAM controller 12. The KAM controller 12 then stores the indicators associated with each of the PWCDs. Stated differently, each stored indicator is a unique identifier of a specific PWCD 36 as opposed to any other PWCDs. If multiple PWCDs are present in the vehicle 10 at the time that the LWCD 34 scans the vehicle 10, a separate, different indicator associated with each PWCD will be stored by the KAM controller 12 so that any one of the PWCDs may be used to authorize a next subsequent restart with the electronic key fob 14 absent. The keyless authority indicator on which the subsequent restart is based may then be an identification of the PWCD 36 associated with the stored indicator being present in the vehicle 10 when restart is requested. For example, pressing the button 30 serves as a restart request, which is sensed and acted upon by KAM controller 12. The KAM controller 12 performs electronic scans for the presence of an electronic key fob 14. If one or more electronic key fob 14 devices are detected, starting is authorized and the propulsion system 17 is enabled to turn on. If an electronic key fob 14 is not present, the KAM controller 12 may then command the LWCD 34 to scan the vehicle 10 again for any PWCDs and, upon the LWCD 34 finding the PWCD 36 to be present and communicating the indicator associated with the PWCD 36 to the KAM controller 12, the KAM controller 12 communicates a start authorization signal to the ECM 26, enabling the propulsion system 17.

The KAM controller 12 may be configured to delay complete vehicle shutdown in the absence of electronic key fob 14 and wait to store indicators of the PWCDs present until a predetermined period of time has run after the shutdown request, referred to as the restart allowance time period. This timed delay may be implemented because the vehicle 10 may be configured to maintain the ignition on state while terminating propulsion, and permitting a restart without a keyless authority indicator being required when the restart is requested relatively quickly following a shutdown, (e.g., during that predetermined period of time immediately after the shutdown request). This may be referred to as a restart allowance time period. Accordingly, the KAM controller 12 may start a timer 60 included within the KAM controller 12 when shutdown is requested, and the timer 60 is run for the restart allowance time period. There is no need for a keyless authority indicator in order to authorize restarting of the vehicle 10 during the restart allowance time period so the indicators of the PWCDs present are stored after the restart allowance time period.

In another example, the keyless authority indicator may be an access code provided to the KAM controller 12 by the PWCD 36 in the vehicle 10 or by the operator or other vehicle occupant via the touchscreen 46 or the keyboard 48 of the operator input device 44. The access code may be provided to the PWCD 36 by the KAM controller 12 via the LWCD 34 upon vehicle shutdown for use in the subsequent restart. In another example, if the vehicle operator discovers that the electronic key fob 14 is not in the vehicle 10 and therefore cannot start the vehicle 10, the operator may use the PWCD 36 or another communication device to contact a vehicle service that confirms authority of the operator, and the remote server 42 communicates a grant or confirmation of restart authority to the CCD 40 which serves as the keyless authority indicator and in turn is communicated by the CCD 40 to the KAM controller 12. In another example, the vehicle may provide an access code on the touchscreen 46 while the vehicle is in the restart allowance time period. After the conclusion of the period, the access code may be entered via touchscreen 46 after requesting starting via on/off button 30.

In still another example, the keyless authority indicator may be biometric data of a vehicle operator or other vehicle occupant, such as a fingerprint provided via the fingerprint pad 50 of the operator input device, or facial recognition or a retinal scan provided via the camera 52 to the KAM controller 12.

In some of the above implementations, the KAM controller 12 may authorize starting of the vehicle 10 based on the keyless authority indicator a single time. Stated differently, the keyless authority indicator is good for one-time use. Examples include when the keyless authority indicator is based on the presence of the PWCD 36 in the vehicle 10, when the keyless authority indicator is an access code received from the PWCD 36 as described above, or if biometric data is available.

In addition to managing vehicle restarts in the absence of the electronic key fob 14, the system 56 implements a key fob missing alert strategy that may decrease the potential for an operator to unknowingly further operate the vehicle 10 without the electronic key fob 14 present, and may do so based on the power mode of the vehicle, whether in park or out of park, and/or based on the open or closed status of any of the doors 20 or windows 18.

For example, the KAM controller 12 is configured to receive information indicative of an in park/out of park status of the vehicle 10. The ECM 26 provides signals to the KAM controller 12 indicative of whether the vehicle 10 is in park, whether it is out of park, and the speed of the vehicle 10 (whether stationary or moving). Additionally, sensors are operatively connected to each of the doors 20 and windows 18. The sensors are operatively connected to the KAM controller 12 and provide sensor signals indicative of an open/closed status of each of the doors 20 and each of the windows 18.

The KAM controller 12 implements the electronic key fob missing alert strategy to provide audio and/or visual alerts indicative of the absence of the electronic key fob 14 in the vehicle 10 and based on the in park/out of park status of the vehicle 10 and whether any of the doors 20 or windows 18 have been opened since the vehicle 10 has been started. The park, door, and window status is used by KAM controller 12 to identify cases under which electronic key fob 14 may have exited the vehicle 10 and triggers interior scans to determine the key fob status. A slight window opening may not be deemed an open state that triggers alerts under the electronic key fob missing alert strategy. For example, a window may need to open an amount more than a minimal threshold distance that would be sufficient to allow the electronic key fob 14 to be discarded through the open window before the KAM controller 12 considers the window 18 as open and proceeds to scan for electronic key fobs 14 for which the absence of such would trigger the alerts discussed below. An example threshold distance D is indicated in FIG. 4 and is measured from a top of the window well to a top edge 18A of the lowered window 18.

In an example, if the vehicle 10 is started and in park, then the alerts will inform the operator so that they may then retrieve the electronic key fob 14, such as if the operator or another occupant left the vehicle 10 with the electronic key fob 14 after the vehicle 10 was started (as may be indicated to the KAM controller 12 by a window 18 or door 20 moving to the open state after starting the vehicle 10) and did not return with the electronic key fob 14. In another example, if the vehicle 10 is out of park, the audio and/or visual alerts will inform the operator that the electronic key fob 14 has become absent either during movement of the vehicle 10 or when in gear with the brake depressed. This may happen, for example, if the electronic key fob 14 has been dropped out of an open window 18 or was inadvertently left on an exterior surface of vehicle 10.

For example, in a situation in which the KAM controller 12 has determined that the vehicle 10 is in park, and that a door 20 or window 18 has been opened since the vehicle 10 was started, the KAM controller 12 will implement a scan to determine whether the electronic key fob 14 is present in the vehicle 10. The scan to determine whether the electronic key fob 14 is present may be delayed for a set period of time after it is determined that the door 20 or window 18 has been opened and/or be delayed until the time that the door 20 or window 18 becomes closed. If the operator is already aware that the electronic key fob 14 is not present, then this may allow a period of time for the operator to retrieve the electronic key fob 14 or for the electronic key fob 14 to be passed into the vehicle 10 through the open window 18 or door 20, for example. If the set period of time passes and the electronic key fob 14 is not present, then the KAM controller 12 will command an initial alert such as by commanding the vehicle audio system 63 to provide, for example, an audible alarm indicating the absence of the electronic key fob 14 in the vehicle 10. In an implementation, the KAM controller 12 will first wait a period of time after the initial scan for key fob presence and perform a confirmation scan to determine the presence of the electronic key fob 14 in the vehicle 10 (e.g., a second scan) and, if the electronic key fob is still not present, only then command the initial alert.

After a set time period following the initial alert, the KAM controller 12 will determine whether the electronic key fob 14 is still absent from the vehicle 10. If the electronic key fob 14 is no longer absent (e.g., it has been retrieved and placed in the vehicle 10 as a result of the initial alert), then the electronic key fob missing alert strategy ends until another door or window is opened, at which point it repeats the above steps. If the electronic key fob 14 is still absent, then the KAM controller 12 will implement a secondary alert, which may include a recurring audio alarm indicative of the absence of the electronic key fob 14. Additionally or alternatively, any one or more of the following alerts may also be implemented as the secondary alert or as part of the secondary alert: a visual alert on the touchscreen 46 or elsewhere on the dashboard 32, an audio message through the audio system 63, a call or text message to the PWCD 36 in the vehicle 10 or to a telephone number stored in the KAM controller 12 (which may be automated, and may provide a message that the electronic key fob 14 is absent).

If any of the secondary alert(s) provided are acknowledged by the vehicle operator or by another vehicle occupant, the secondary alert (if recurring) will then be inhibited and shifting the vehicle 10 out of park will be permitted. The implementation of establishing a keyless authority indicator as described herein will then be implemented at or when vehicle shutdown is requested and can then be used for restart authorization as described above.

The KAM controller 12 may implement a shift lock strategy wherein, if the secondary alert is not acknowledged by the vehicle operator, shifting out of park will be inhibited unless the vehicle operator completes a shift lock override process. For example, the shift lock override process may require the vehicle operator to press a vehicle brake for at least a predetermined amount of time to allow the vehicle 10 to be shifted out of park. The predetermined amount of time may be monitored by the timer 60. The predetermined amount of time is prolonged in comparison to the amount of time that the brake is pressed when the electronic key fob 14 is present in the vehicle 10 to shift out of park. In addition to the prolonged brake press, the shift lock override process may require the vehicle operator to specifically confirm a request shift lock override, such as by confirming whether shift lock override is requested via input to the operator input device 44.

In a situation in which the KAM controller 12 has determined that the vehicle 10 is out of park, the electronic key fob missing alert strategy is implemented to address a situation in which the electronic key fob 14 has gone missing at some point after the vehicle 10 has been shifted out of park. For example, a window 18 may have been opened while the vehicle 10 is moving (or a window 18 or door 20 may have been opened while the vehicle 10 is stopped but not in park, such as at a stop light) or a passenger may have unlocked and exited the vehicle 10 with the electronic key fob 14 while the vehicle remained out of park. After determining that a door 20 or window 18 has been opened, the KAM controller 12 will implement a scan to determine whether the electronic key fob 14 is present in the vehicle 10 (e.g., will direct the LWCD 34 to conduct the scan). If the electronic key fob 14 is not present, the KAM controller 12 will implement an alert such as the recurring audio alarm indicative of the absence of the electronic key fob 14. Additionally, any one or more of the following alerts may also be implemented as part of the electronic key fob missing alert: a visual alert on the touchscreen 46 or elsewhere on the dashboard 32, or an audio message through the audio system 63. The alert strategy for when the vehicle 10 is out of park differs from that discussed above and provided when the vehicle is in park in that there is no staged alert strategy including an initial alert and secondary alert. Additionally, in one implementation, the alerts provided when the vehicle is out of park may not include the option of a call or text message to the PWCD 36 in the vehicle 10.

If any of the alert(s) provided are acknowledged by the vehicle operator or by another vehicle occupant, the alert, if recurring, will then be inhibited. The implementation of establishing a keyless authority indicator as described herein will then be implemented at or when vehicle shutdown is requested and can then be used for restart authorization as described above.

Referring to FIGS. 5A and 5B, in implementations in which the presence of a PWCD 36 both associated with the preceding vehicle shutdown and the next vehicle restart as described above, the method 100 of key absence management of the vehicle 10 begins prior to the vehicle shutdown preceding the vehicle restart in which a keyless authority indicator will be used. In any implementations in which the keyless authority indicator is only an access code or the biometric data, the method 100 may skip steps 116-126 described herein.

The method 100 begins at the Start 102, in which the ignition of the vehicle 10 is on. It is assumed that at the Start 102, the vehicle 10 has been started with the electronic key fob 14. The method 100 proceeds to step 104, in which the KAM controller 12 receives the in park/out of park status of the vehicle 10, as discussed above. The method 100 also includes determining the open/closed status of the door(s) 20 and window(s) 18 in step 106.

Next, the method 100 proceeds to step 108, in which it is determined whether the electronic key fob 14 is in the vehicle 10. If it is determined that the electronic key fob 14 is not in the vehicle 10, the method may include step 110, implementing the electronic key fob missing alert strategy discussed above, which varies dependent upon the in park/out of park status of the vehicle 10 and the open/closed status of the window(s) 18 and door(s) 20 as discussed above. Additionally, if the vehicle is in park, the method 100 may include implementing the shift lock strategy in step 112, including the shift lock override steps described above.

The method 100 then repeat steps 104 through 114 (and step 112 if the vehicle 10) remains in park) until the KAM controller 12 receives a vehicle shutdown request in step 114. When shutdown is requested in step 114, the method 100 may proceed immediately to step 116 to determine the presence of one or more PWCDs 36 in the vehicle 10 as described above. Alternatively, in some implementations, the method 100 may implement the restart allowance time period described above by proceeding to steps 118, 120, and 122 before performing step 116. There is no need for a keyless authority indicator in order to authorize restarting of the vehicle 10 during the restart allowance time period. Accordingly, the KAM controller 12 may start the timer 60 in step 118. If a restart is requested in step 120 before the restart allowance time period has expired in step 122, then restart is authorized, and the method 100 returns to Start 102. If restart is not requested before the restart allowance time period expires in step 122, then the method 100 proceeds to step 116.

If the presence of one or more PWCDs 36 in the vehicle 10 is determined in step 116, then the method 100 proceeds to step 124 in which the KAM controller 12 stores the indicator of any PWCDs 36 determined to be present in step 116, and then to step 126 in which a one-time use of the PWCD 36 as a keyless authorization indicator is activated. The method 100 then proceeds to step 128 and the vehicle 10 is shutdown.

The flow diagram in FIG. 5A continues in FIG. 5B with Position A indicated in FIG. 5A corresponding with Position A indicated in FIG. 5B. At step 130, the KAM controller 12 receives a request for the next vehicle restart following the shutdown in step 128 in which the electronic key fob 14 was not present. The method 100 proceeds to step 132 to monitor whether the electronic key fob 14 is present in the vehicle 10. If the electronic key fob 14 is present, the method 100 proceeds directly to step 136 and authorizes starting of the vehicle 10. If it is determined in step 132 that the electronic key fob 14 is not present in the vehicle 10, then the method 100 proceeds to step 134 to detect any of the keyless authority indicators discussed herein. These include at least one of: an identification of the presence in the vehicle 10 of the PWCD 36 associated with the stored indicator of step 124, an access code received from the PWCD 36 or another PWCD in the vehicle 10 or via the operator input device 44, authorization granted via interaction of the CCD 40 with the remote server 42, or biometric data of the vehicle operator or other occupant retrieved by the operator input device 44, the camera 52, or the microphone 62 as described herein. If any keyless authority indicator is detected, then the method 100 proceeds to step 136 and authorizes starting of the vehicle 10 in the absence of the electronic key fob 14. The method 100 then moves to step 138 in which it returns to Start 102. If at step 134 a keyless authority indicator is not present, the method 100 returns to step 130, awaiting a subsequent restart request.

Accordingly, the system 56 and method 100 described herein selectively authorize operation of the vehicle 10 (e.g., restarting the vehicle 10 after a shutdown in which the electronic key fob 14 was not present in the vehicle 10) in a secure manner by limiting the conditions under which restart is authorized. Additionally, the system 56 and the method 100 help to minimize the possibility of an operator inadvertently leaving a key fob 14 behind by providing an alert management strategy that may be based in part on the in park/out of park status of the vehicle 10 and/or the open/closed status of a door 20 or window 18 of the vehicle 10 as described herein.

While the best modes for carrying out the disclosure have been described in detail, those familiar with the art to which this disclosure relates will recognize various alternative designs and embodiments for practicing the disclosure within the scope of the appended claims.

What is claimed is:

1. A system for key absence management in a vehicle configured to be started by an electronic key fob, the system comprising:
    a key absence management controller configured to authorize starting of the vehicle by:
        monitoring presence and absence of the electronic key fob in the vehicle;
        based on the presence of the electronic key fob in the vehicle:
            authorizing starting of the vehicle; and
        based on the absence of the electronic key fob in the vehicle:
            detecting a keyless authority indicator; and
            authorizing starting of the vehicle based on the keyless authority indicator;
        wherein the keyless authority indicator is associated with the presence of a personal wireless communication device in the vehicle both at the time of a last prior vehicle shutdown request and at the time of a next requested restart.

2. The system of claim 1, wherein the key absence management controller is further configured to:
    receive a vehicle shutdown request;
    prior to vehicle shutdown, determine the presence of the personal wireless communication device in the vehicle;
    store an indicator associated with the personal wireless communication device; and
    wherein the keyless authority indicator is an identification of the personal wireless communication device associated with the stored indicator being present in the vehicle.

3. The system of claim 2, wherein the key absence management controller includes a timer and is configured to:
    start the timer when the vehicle shutdown request is received; and
    wherein storing the indicator associated with the personal wireless communication device occurs after the timer runs for a predetermined period of time.

4. The system of claim 1, wherein the key absence management controller authorizes starting of the vehicle based on the keyless authority indicator a single time.

5. The system of claim 1, wherein the vehicle includes a door and a window;
    wherein the key absence management controller is further configured to:
        receive information indicative of an in park/out of park status of the vehicle;
        receive information indicative of an open/closed status of at least one of the door and the window;
        provide audio and/or visual alerts indicative of the absence of the electronic key fob in the vehicle, and
    wherein the audio and/or visual alerts are based on the in park/out of park status of the vehicle and/or the open/closed status of the at least one of the door and the window.

6. A method of key absence management in a vehicle configured to be started with an electronic key fob, the method comprising:
    monitoring presence and absence of the electronic key fob in the vehicle;
    receiving a vehicle shutdown request;
    prior to vehicle shutdown:
        determining the presence of a personal wireless communication device in the vehicle; and
        storing an indicator associated with the personal wireless communication device;
    after vehicle shutdown:
        based on the presence of the electronic key fob in the vehicle:
            authorizing starting of the vehicle; and
        based on the absence of the electronic key fob in the vehicle:
            detecting a keyless authority indicator; and
            authorizing starting of the vehicle based on the keyless authority indicator;
        wherein the keyless authority indicator is an identification of the personal wireless communication device associated with the stored indicator being present in the vehicle.

7. The method of claim 6, further comprising:
    starting a timer when the vehicle shutdown is requested; and
    wherein storing the indicator associated with the personal wireless communication device occurs after the timer runs for a predetermined period of time.

8. The method of claim 6, wherein authorizing starting of the vehicle based on the keyless authority indicator occurs a single time.

9. The method of claim 6, wherein the vehicle includes a door and a window, and the method further comprising:
    receiving information indicative of an in park/out of park status of the vehicle;
    receiving information indicative of an open/closed status of at least one of the door and the window; and
    providing audio and/or visual alerts indicative of the absence of the electronic key fob in the vehicle;
    wherein the audio and/or visual alerts are:
        based on the open/closed status of at least one of the door and the window; and/or
        based on the in park/out of park status of the vehicle.

10. A vehicle configured to be started by an electronic key fob, the vehicle comprising:
    a vehicle body defining an interior space;
    a key absence management controller configured to authorize starting of the vehicle by:
        monitoring presence and absence of the electronic key fob in the interior space;
        based on the presence of the electronic key fob in the interior space:
            authorizing starting of the vehicle; and
        based on the absence of the electronic key fob in the interior space:
            detecting a keyless authority indicator; and
            authorizing starting of the vehicle based on the keyless authority indicator;
    wherein the keyless authority indicator is associated with the presence of a personal wireless communication device in the vehicle both at the time of a last prior vehicle shutdown request and at the time of a next requested restart.

11. The vehicle of claim 10, further comprising:
a local wireless communications device in the vehicle configured to be operatively connected with a personal wireless communication device in the vehicle;
wherein the key absence management controller is configured to be operatively connected to the local wireless communications device; and
wherein the keyless authority indicator is an identification of the personal wireless communication device being present in the vehicle as communicated to the key absence management controller by the local wireless communications device.

* * * * *